United States Patent [19]
Parekh et al.

[11] 3,917,573
[45] Nov. 4, 1975

[54] PROCESS FOR THE PREPARATION OF WATER EMULSIFIABLE ANIONIC RESINS AND THE RESINS THUS PRODUCED

[75] Inventors: Girish Girdhar Parekh, Stamford; Werner Josef Blank, Wilton, both of Conn.

[73] Assignee: American Cyanamid Company, Stamford, Conn.

[22] Filed: Jan. 24, 1974

[21] Appl. No.: 436,260

Related U.S. Application Data

[63] Continuation-in-part of Ser. No. 293,211, Sept. 28, 1972, abandoned, which is a continuation-in-part of Ser. No. 139,912, May 3, 1971, abandoned.

[52] U.S. Cl. ............................................. 260/78.5 T
[51] Int. Cl.² ............................................. C08F 8/14
[58] Field of Search ................................. 260/78.5 T

[56] References Cited
UNITED STATES PATENTS 2,988,539   6/1961   Cohen et al. ......................... 260/78
3,532,768   10/1970  Dalibor et al. ....................... 260/854
3,642,726   2/1972   Heilman ............................ 260/78.5 T

FOREIGN PATENTS OR APPLICATIONS 544,326   1/1932   Germany

Primary Examiner—John Kight, III
Attorney, Agent, or Firm—James T. Dunn

[57]  ABSTRACT

There is provided a process for preparing a nongelled, anionic vinyl polymer prepared by the copolymerization of (a) an $\alpha,\beta$-ethylenically unsaturated compound, such as styrene or, (b) maleic anhydride, and, optionally, (c) an alkyl acrylate, such as butyl acrylate, which is followed by reaction with an appropriate aliphatic diol containing of from 3 to 8 carbon atoms and possessing either primary and secondary hydroxyl groups, such as 1,2-propylene glycol, or sterically hindered primary hydroxyl groups, such as 2,2-dimethyl-1,4-butanediol. Resultant polymer is useful as a component of a coating composition.

10 Claims, No Drawings

PROCESS FOR THE PREPARATION OF WATER EMULSIFIABLE ANIONIC RESINS AND THE RESINS THUS PRODUCED

CROSS REFERENCES TO RELATED APPLICATIONS

This application is a continuation-in-part of our copending application, Ser. No. 293,211, filed Sept. 28, 1972, now abandoned which in turn is a continuation in part of our earlier application, Ser. No. 139,912, filed May 3, 1971, now abandoned.

BACKGROUND OF THE INVENTION

Resinous polymeric compositions have been used for a plurality of years as coating compositions in which the resinous material was dispersed or dissolved in an organic solvent and was applied to a substrate by brushing, dipping, spraying and the like, and the coating was then allowed to dry or was baked at an elevated temperature so as to flash off the organic solvent into the atmosphere and thereby deposit a continuous film on the substrate. Former techniques of application, such as those mentioned above, had a number of shortcomings such as uneven distribution of the film layer, waste of the coating composition, pollution of the atmosphere and the like. Coatings applied by means of electrodeposition have become widely accepted in recent years because the coatings are easily applied to metal substrates and the aqueous medium from which they are applied does not volatilize any organic solvent into the atmosphere on drying or baking and thereby prevents the pollution of the atmosphere.

THE FIELD OF THE INVENTION

This invention is in the field of producing an anionic water-dispersible, non-gelled vinyl polymer containing carboxyl and alcoholic hydroxyl functions derived from maleic anhydride, an essential starting component of the process, which polymeric materials are particularly useful in the field of electrodepositing paint films on metal substrates.

SUMMARY OF THE INVENTION

The present invention relates to a novel process for introducing a plurality of functions into a vinyl polymer. More particularly, it relates to a process for introducing into a non-gelled vinyl polymer at least carboxyl and hydroxyl functions which polymer is substantially free of any unreacted monomer. Still more particularly, the invention is concerned with an improved process for preparing a non-gelled anionic vinyl polymer prepared by the copolymerization of (a) an $\alpha,\beta$-ethylenically unsaturated compound, such as styrene or, (b) maleic anhydride, and, optionally, (c) an alkyl acrylate, such as butyl acrylate, which is followed by reaction with an appropriate aliphatic diol containing of from 3 to 8 carbon atoms and possessing primary and secondary hydroxyl groups, such as 1,2-propylene glycol, or sterically hindered primary hydroxyl groups, such as 2,2-dimethyl-1,4-butanediol.

It is known that non-gelled, vinyl polymers containing carboxyl groups only can be prepared by reacting, for instance, an interpolymer of styrene, maleic anhydride, and an alkyl acrylate with a monohydric alcohol. However, such polymers are not wholly satisfactory as a component for an electrocoating composition. Coatings so-prepared require excessively high temperatures to effect curing during the baking cycle. To remedy this deficiency, it has been proposed to introduce a plurality of carboxyl and other functions into a vinyl copolymer or terpolymer by initially reacting equimolar amounts of maleic anhydride with a dihydric alcohol, such as 1,2-propylene glycol to form a reaction mixture, and then copolymerizing the so-formed reaction mixture with styrene to produce a polymer containing both carboxyl and hydroxyl functions. Nonetheless, the resultant polymer contains inherently unreacted monomer which deleteriously affects its use as a coating composition component in that an article or substrate ultimately coated lacks desired smoothness. Further, prior to the instant discovery, the preparation of an ester formed from the prereaction of equimolar amounts of maleic anhydride with a dihydric alcohol had been believed to be necessary for the reason that an initially prepared copolymer of maleic anhydride and styrene, if subsequently reacted with a dihydric alcohol, was thought to gel or cross-link the initial copolymer so-prepared. This is because certain dihydric alcohols are known to form bis-compounds when analogously reacted with maleic anhydride. Hence, techniques for preparing non-gelled polymers containing both hydroxyl and carboxyl functions prepared from initially copolymerized maleic anhydride and a different $\alpha,\beta$-ethylenically unsaturated polymerizable compound followed by reaction with a dihydric alcohol were not attempted because undesirable gelling was contemplated. If a process could be provided to avoid the difficulties of the prior procedures, such would meet a long-felt need in the art.

In a coating composition which can be used effectively, particularly to enhance bath stability and to attain high pigment levels and smoothness in the coating of metallic articles by conventional techniques and, more particularly, by electrophoretic techniques, a novel method for preparing one of the components, namely, the anionic vinyl resin component free from detectible monomer, has been discovered. The latter novel resin component is prepared by copolymerizing an $\alpha,\beta$-ethylenically unsaturated compound with maleic anhydride and, optionally, with an alkyl acrylate, followed by reaction with an appropriate aliphatic diol containing, for instance, both primary and secondary hydroxyl groups and from 3 to 8 carbon atoms, hereinbelow more fully defined. As previously stated in the prior practice where an alkyl acrylate, an hydroxyalkylmaleate, and styrene are copolymerized under similar reaction conditions, detectible monomer, usually in the range of 0.3 to 3%, is found to be present in the polymer.

DESCRIPTION OF THE PREFERRED EMBODIMENTS

As one component of a five-component system, there is provided a process for preparing an anionic, water-dispersible, non-gelled polymer containing at least carboxyl and alcoholic hydroxyl functions. The resultant polymer, substantially free from unreacted monomer, is prepared by initially polymerizing in the presence of a free radical initiator a blend comprising (A) maleic anhydride and (B) a different polymerizable $\alpha,\beta$-ethylenically unsaturated compound and, thereafter, reacting the resultant polymer with an appropriate aliphatic diol containing both primary and secondary hydroxyl groups.

The overall reactions may illustratively be written as follows:

[I] 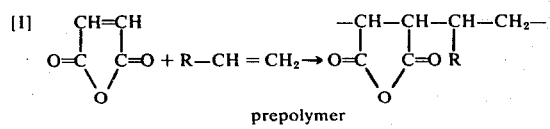
prepolymer where R is an alkyl group from 1 to 16 carbon atoms, lower alkoxy, aryl, and alkaryl.

[II] 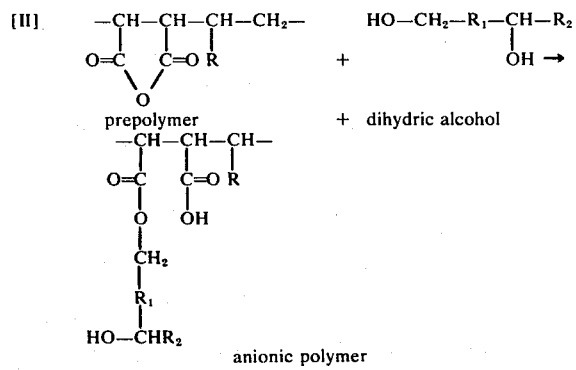

where R is as defined above, $R_1$ is a lower alkyl radical containing from 0 to 5 carbon atoms, $R_2$ is an alkyl radical from 1 to 6 carbon atoms and the sum of $R_1$ and $R_2$ equals 1 to 6 carbon atoms.

In general, the mole ratio of maleic anhydride to the $\alpha,\beta$-ethylenically unsaturated compound for best operation ranges from 0.1–1 to 1, respectively, and, preferably, 0.3–0.6 to 1.

It is a good practice in Step [I] to employ an acrylate, particularly when the $\alpha,\beta$-ethylenically unsaturated polymerizable compound, different from maleic anhydride is a styrene. In that event, the reaction involving prepolymer formation may be written as follows:

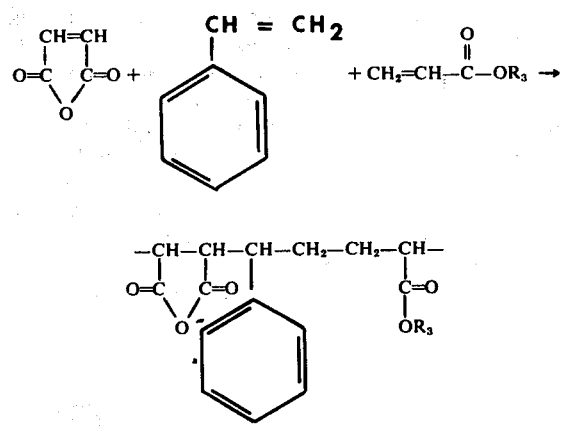

where $R_3$ is an alkyl group having from 1 to 12 carbon atoms.

This prepolymer is reacted in an identical manner as shown above in Step [II].

Exemplary of the polymerizable $\alpha,\beta$-ethylenically unsaturated compounds different from maleic anhydride in Step [I] are: styrene, ortho-, meta-, or para-alkyl styrenes, such as o-, m-, or p-methyl, ethyl, propyl, and butyl styrenes; 2,4-dimethyl styrene, 2,3-dimethyl styrene, 2,5-dimethyl styrene, halo-ring, or side-chain styrenes, such as α-chloro styrene, ortho-, meta-, or para-chloro styrene; 2,4-dichloro styrene, 2,3-dichloro styrene, 2,5-dichloro styrene, or the alkyl side-chain styrenes, such as α-methyl styrene, α-ethyl styrene, or the vinyl ethers such as methyl vinyl ether, ethyl vinyl ether, propyl vinyl ether, n-butyl vinyl ether, t-butyl vinyl ether, or the olefins such as propylene, 1,2-butene, 1,2-hexene, $C_{12}$ α-olefin, $C_{14}$ α-olefin, $C_{18}$ α-olefin, and the like.

Where styrene is employed to form a polymer in Step [II] above, illustrative acrylates which may be concomitantly employed are: methyl acrylate, ethyl acrylate, propyl acrylate, butyl acrylate, octyl acrylate, decyl acrylate, lauryl acrylate, metyl methacrylate, ethyl methacrylate, butyl methacrylate, heptyl methacrylate, decyl methacrylate, and the like.

It will be noted that in Step [I] above, a prepolymer or copolymer is produced which contains an hetero-O-moiety. In Step [II], the latter moiety is affected by opening the hetero-O-ring from the maleic anhydride by means of an appropriate diol to provide both carboxyl and hydroxyl functions. In Step [II], the diol is exemplified by an appropriate lower alkylene glycol. Alternatively, other diols which can be used are those that contain from 3 to 8 carbon atoms and possess primary and secondary hydroxyl groups. At least equimolar amounts of diol and anhydride groups in the prepolymer are reacted. However, up to about a 25% molar excess of the diol may be employed.

In general, the aforementioned aliphatic diols, fall into two catagories. In one preferred catagory, they contain primary and secondary hydroxyl groups, such as 1,2-propylene glycol, 1,2-butanediol, 1,3-butanediol, 2,2,4-trimethyl-1,3-pentanediol, and 2-ethyl-1,3-hexanediol. In a second, the diols contain a primary hydroxyl group and a primary sterically hindered hydroxyl group, such as 2,2-dimethyl-1,4-butanediol and 2,2-dimethyl-1,5-pentanediol.

Free radical initiators required for the polymerization reaction are commercially available. Any may be used in the process of the present invention. Illustrative of such initiators are di-t-butyl peroxide, benzoyl peroxide, and azobisiso-butyronitrile. Other conditions of reactions, such as temperatures of reaction, are known. For instance, polymerization occurs at temperatures ranging from about 125°C. and 200°C. Resultant anionic polymer is found to be free from unreacted monomer as determined by vapor phase chromatographic tests.

For good bath stability of electrocoating paint and good storage stability of water-dispersed sprayable paint, as well as for good corrosion and humidity resistance, high concentrations of pigments, as well as smoothness and blister-free appearance, it is advantageous to utilize anionic polymers containing from about 1.0 to about 25%, and preferably from 4 to 15% of the carboxyl function, and from 0.5 to 10%, and preferably from 1.5 to 4% of the hydroxyl function, all percentages based on the weight of the overall finished polymer.

In general, the finished polymer free from detectible monomer exhibits the following properties: acid number ranging from 70 to 250; hydroxyl number ranging from 45 to 100; viscosity $Z_2$ to $Z_6$ (when solids equal 50 to 80%); Gardner color from 1 to 12.

It may be desirable to use appropriate surfactants to disperse the aforementioned polymeric materials. The term "water-dispersible", therefore, is intended to encompass both aqueous solutions as well as dispersions in which the polymeric material is suspended in the aqueous medium.

All of the anionic, water-dispersible, non-gelled, polymeric materials having carboxyl groups and alcoholic hydroxyl groups have water-sensitive sites which should be tied up by interreaction with the second component of the system, namely, an amine-aldehyde compound in a cross-linking mechanism. Prior to effecting cross-linking, the amine-aldehyde compounds can function as plasticizers for the total composition.

The second component of the coating mixture containing the hereinabove defined polymer is an amine-aldehyde cross-linking agent. For coating applications other than electrocoating, there may be used any amine-aldehyde cross-linking agent whether fully etherified, partially etherified, or unetherified. However, for electrocoating applications, the use of fully etherified amine-aldehyde cross-linkers is required. Usually, the latter amine-aldehyde cross-linking agents are present in amounts ranging from about 4.9 to about 50%, and the balance being principally the polymer containing at least carboxyl and hydroxyl functions. Advantageously, any fully etherified amine-aldehyde cross-linking agent can be incorporated herein, as for instance, hexakis methoxymethyl melamine which is prepared according to the process shown in U.S. Pat. No. 2,998,411, which patent is incorporated herein by reference. Modification of the hexakis methoxymethyl melamine is shown in U.S. Pat. No. 3,471,388, wherein a mixture of substantially water-insoluble, substantially fully etherified mexamethylolmelamines which have no more than four methoxymethyl groups on the average and at least two alkoxy methyl groups selected from the group consisting of ethoxy methyl, propoxy methyl, and butoxy methyl. These mixed, fully etherified hexamethylolmelamine compounds are disclosed in said patent and incorporated herein by reference. Additionally, the fully etherified tetramethylolbenzoguanamine compounds may also be used, such as those disclosed in U.S. Pat. No. 3,091,612 and in earlier U.S. Pat. Nos. 2,197,357 and 2,454,495, all of which are incorporated herein by reference.

The anionic polymer and the fully etherified amine-aldehyde cross-linking agent are admixed with agitation. Usually, a neutralizing agent, such as sodium hydroxide, potassium hydroxide, calcium carbonate, diethylamine, triethylamine, or diisopropanolamine, is added to effect solubilization of the polymer in amounts ranging from 1 to 10%, by weight, of the polymer.

It has been found that for a satisfactory electrocoating bath, such can be prepared from the aforementioned mixture by blending the same with deionized water to effect its emulsification. It is good practice to next age the emulsified blend for a period of 24 hours. The solids content of the bath is maintained at from 1 to 20%, and preferably from 5 to 15%, based on the overall weight of the emulsion.

Although formulations of the above components find utility in the areas of conventional organic aqueous spray coating, adhesives, and thermoset resins, they find particular utility in electrodeposition techniques, since the properties of electrocoated surfaces are markedly enhanced, as for instance, in smoothness, resistance to corrosion and solvent exposure.

Electrodeposition is effected at room temperature in the conventional manner by utilizing a metallic substrate as an anode and any metallic surface as the cathode by applying a potential of from 25 volts to 500 volts, and preferably from 50 volts to 250 volts, across the electrodes. Generally, one to two minutes are sufficient to accomplish the electrocoating process.

The coated substrate is next water-washed, usually with deionized water, and heat-cured to effect cross-linking of the polymer of the present invention. This can be accomplished at temperatures ranging from about 110°C. to 175°C., or even higher. Further, the coated, cured surface is impervious to organic solvents.

It is also with the purview of the present invention to incorporate various dyes and pigment additives to impart color to the polymeric comporisions prepared by the process disclosed. For instance, compatible dyes or pigments, such as $TiO_2$, $Fe_2O_3$, metal chromates, such as lead chromate or strontium chromate, or carbon black can be used, such that the resultant coated metal substrate is white, red, yellow, black, or any desired color. Usually, the amounts of pigment incorporated therein range from about 0.1 to about 6% of the overall bath when employing electrocoating techniques and amounts ranging from about 25 to about 70%, or higher, when using spray coating or dip coating techniques without disturbing bath stability.

The following examples are set forth primarily for purposes of illustration, and any specific enumeration of detail contained therein should not be interpreted as a limitation except as indicated in the appended claims. All parts and percentages are by weight unless otherwise indicated.

EXAMPLE 1

Reaction of Styrene-Maleic Anhydride Copolymer With 1,2-Propylene Glycol

To a suitable reaction vessel are added 88 parts of a 50% ethyl amyl ketone solution of styrene-maleic anhydride copolymer, a product of Atlantic Richfield Company identified as SMA 3000A and having an acid number equal to 284, 11 parts of 1,2-propylene glycol, and 0.5 part of triethylamine. The mixture is stirred at 135°C. for 2 hours under reflux. After two hours, the product is ungelled; and acid number of the product is found to be 122 to 125 based on solids. The calculated acid number is 120. Resultant product is diluted with 34 parts of n-butanol to obtain 40% solids.

EXAMPLE 2

A. Reaction of α-Olefin-Maleic Anhydride Copolymer With 1,2-Propylene Glycol

To a suitable reaction vessel are added 95 parts of a 50% ethyl amyl ketone solution of $C_{14}$ α-olefin-maleic anhydride copolymer, a product of Gulf Oil Chemical Company identified as PA-14 and having an acid number equal to 384, 16 parts of 1,2-propylene glycol, and 0.5 part of triethylamine. The mixture is stirred at 55°C. for 7 hours. After this period, the reaction product is ungelled; and acid number of the product is found to be 158 to 165 based on solids. The calculated acid number is 155. Resultant product is diluted with 40 parts of n-butanol to obtain 40% solids.

B. Reaction of $C_6$ α-Olefin-Maleic Anhydride Copolymer With 1,3-Butanediol

To a suitable reaction vessel are added 100 parts of a 50% ethyl amyl ketone solution of $C_6$ α-olefin-maleic anhydride copolymer, a product of the Gulf Oil Chemical Company identified as PA-6 and having an acid number equal to 615, 31 parts of 1,3-butanediol and 0.5 part of triethylamine. The mixture is stirred at 55°C. for 7 hours. At the end of this period, the reaction product is ungelled, and acid number of the product is found to be 235 to 240 based on solids. The calculated acid number is 228. The resultant product is diluted with 57 parts of n-butanol to obtain 40% solids.

EXAMPLE 3

Reaction of Vinyl Ether Maleic Anhydride Copolymer With 1,2-Propylene Glycol

To 50 parts of a 10% N,N-dimethyl formamide solution of ethyl vinyl ether-maleic anhydride copolymer, a product of General Aniline and Film Corporation identified as Gantrez 119 and having an acid number equal to 600 are added 6 parts of 1,2-propylene glycol and 0.5 part of triethylamine. The mixture is stirred at 55°C. for 18 hours. After this period, the reaction product is ungelled; and the acid number of the product is found to be 224 based on solids. The calculated acid number is 212.

EXAMPLE 4

Reaction of Styrene-Maleic Anhydride Copolymer With 1,2-Butanediol

To 88 parts of a 50% solution of styrene-maleic anhydride copolymer of Example 1 in ethyl amyl ketone are added 13 parts of 1,2-butanediol and 0.5 part of triethylamine. The mixture is stirred at 135°C. for 2 hours under reflux. After 2 hours, the product is ungelled and acid number of the product is found to be 120 to 125 based on solids. The calculated acid number is 115. Resultant product is diluted with 34 parts of n-butanol to obtain 40% solids.

EXAMPLE 5

To a suitable reaction vessel is added a monomer blend of 38.5 parts of butyl acrylate, 19.3 parts of styrene, 8.3 parts of maleic anhydride, and 0.3 part of 2-sulfoethyl methacrylate and copolymerized at 140°C. to 145°C. in the blend of 6.4 parts of cumene and 2 parts of mesityl oxide employing 2 parts of ditertiary butyl peroxide as the free radical initiator. The total monomer feed is slowly added over a period of 2½ hours. After holding the reaction temperature at 140°C. to 145°C. for 2 more hours, 7 parts of 1,2-propylene glycol and 0.4 part of triethylamine are added. The temperature is held at 135°C. for 2 hours. Subsequently, the polymer is diluted with n-butanol (16.4 parts). Resultant polymer analyzes as having an acid number of 74, an hydroxyl number of 65, and a viscosity of 200 poises at 25°C. Vapor phase chromatography indicates the absence of any unreacted monomer.

Similar polymers are obtained when substituting either 2,2-dimethyl-1,4-butanediol or 1,3-butanediol in lieu of the 1,2-propylene glycol above. Employing 19.3 parts of styrene, 18.2 parts of maleic anhydride, 48.5 parts of butyl acrylate and 16.4 parts of 1.2 propylene glycol, a polymer of acid number 105–110, hydroxyl number 100 and viscosity of 250 poises at 25°C. is obtained. No unreacted monomer is observed.

EXAMPLE 6

Repeating the procedure of Example 5 in every respect except that 2-sulfoethyl methacrylate is omitted, the resultant polymer analyzes as having an acid number of 72, an hydroxyl number of 65, and a viscosity of 210 poises at 25°C. Vapor phase chromatography indicates the absence of any unreacted monomer.

Similar polymers are obtained when either utilizing 1,2-butanediol or 2-ethyl-1,3-hexanediol in place of 1,2-propylenediol above.

COMPARATIVE EXAMPLE 7

This example illustrates a prior art procedure employing a reaction mixture formed from the reaction of maleic anhydride and 1,2-propylene glycol.

As in Example 1 above, a monomer blend of 38.5 parts of butyl acrylate, 19.3 parts of styrene, and 15.4 parts of a mixture formed from the reaction of equimolar amounts of maleic anhydride and 1,2-propylene glycol is copolymerized in a blend of 10 parts of 2-ethoxyethanol, 6.4 parts of cumene, and 2 parts of mesityl oxide under the same reaction conditions (i.e., time, temperature, and catalyst) as employed in Example 5. Finally, the polymer is diluted with additional 2-ethoxyethanol (6.4 parts) and analyzed as having an acid number of 75, an hydroxyl number of 65, and a viscosity of 150 poises at 25°C. Vapor phase chromatography indicated the presence of 1% unreacted maleate monomer.

COMPARATIVE EXAMPLE 8

As in Example 7 above, a monomer blend of 38.5 parts of butyl acrylate, 19.3 parts of styrene, and 15.4 parts of a mixture resulting from the reaction of equimolar amounts of polypropylene glycol and maleic anhydride is copolymerized in a mixture of 6.4 parts of cumene and 2 parts of mesityl oxide under the identical reaction conditions of time, temperature, and catalyst employed therein. Prior to complete reaction, the reaction mixture gelled and could not be further processed.

EXAMPLE 9

As in Example 6 above, a monomer blend of 38.5 parts of butyl acrylate, 19.3 parts of styrene, and 8.3 parts of maleic anhydride is copolymerized at 165°C. in 6.4 parts of p-cymene employing ditertiary butyl peroxide (2 parts) as the radical initiator. The feed time of the monomer blend is 3½ hours. The reaction is held at 165°C. for 1 hours after complete addition of the monomer blend. Subsequently, the reaction temperature is lowered to 135°C., and 7.5 parts of 1,2-propylene glycol and 0.4 part of triethylamine are added. The reaction temperature is held at 135°C. for 2 hours. Resultant polymer is diluted with n-butanol (16.4 parts). On analysis, it was found to be free of monomer and had an acid number of 71 and an hydroxyl number of 67.

EXAMPLE 10

The procedure of Example 9 is repeated except that 0.3 part of 2-sulfoethyl methacrylate is added to form the finished anionic resin containing hydroxyl, carboxyl, and sulfonic acid functions free of monomer.

EXAMPLE 11

To a paste consisting of 221.1 parts of the polymer of Example 5, 4 parts of dimethylethanolamine, and 226.4 parts of titanium dioxide prepared on a three roll mill is added a blend of 117.6 parts of the polymer of Example 5 and 41.8 parts of tetraethoxymethyl dimethoxymethyl melamine. To this total paste, a blend of 0.8 part of p-toluene sulfonic acid, 15.4 parts of cellosolve, 7.1 parts of dimethylethanolamine, and 34 parts of deionized water is added in a cowel mixer. Finally, the latter is diluted with 305.7 parts of deionized water.

Aluminum panels were spray-coated with the emulsion paint obtained above and baked at 165°C. for 20 minutes. The film thickness was approximately 1 mil and gloss 90% (60°) and 85% (20°). The film appearance was good.

COMPARATIVE EXAMPLE 12

A similar coating composition was prepared with the polymer prepared in Example 7 above following the procedure of Example 11. However, to obtain a paint emulsion on the addition of deionized water, there results a coagulated composition. This composition could not be spray-coated on aluminum or any other metal substrate.

EXAMPLE 13

To the mixture of 77 parts of polymer prepared in Example 5 above, 18 parts of tetra(ethoxymethyl)di(methoxymethyl) melamine, 4 parts of diisopropanolamine, and 28 parts of titanium dioxide (rutile type) are added with aditation. To this paste is added deionized water (860 parts) stepwise under vigorous agitation.

Resultant aqueous paint, after aging as a bath for 24 hours, is employed to electrocoat zinc phosphated steel and aluminum substrates. After rinsing with deionized water, the coated panels are baked at 125°C. for 30 minutes.

Film properties obtained are summarized in Table I below.

TABLE I

| Steel Substrate | Thickness (mil) | Knoop Hardness | Impact (Reverse) In. Lb. | Gloss (in %) (60°) | (20°) |
|---|---|---|---|---|---|
| 200 V | 0.6 | 8.4 | 60 | 77 | 45 |
| 250 V | 0.9 | 4.8 | 40–50 | 79 | 53 |
| Aluminum | | | | | |
| 200 V | 0.9 | 4.8 | 20 | 81 | 64 |

Similar results are obtained with compositions prepared from the polymer prepared in Example 9 above.

EXAMPLE 14

To the mixture of 77 parts of the polymer as prepared in Example 6, 18 parts of tetra(ethoxymethyl)di(methoxymethyl) melamine, 4 parts of diisopropanol amine, and 28 parts of titanium dioxide (rutile type) are added with agitation. To this paste is added deionized water (860 parts) in portions under vigorous agitation.

Resultant aqueous paint, after aging for 24 hours, is employed to electrocoat zinc phosphated steel and aluminum substrates. The coated panels are baked at 175°C. for 20 minutes. The film properties obtained are similar to those obtained in Example 9 above.

COMPARATIVE EXAMPLE 15

To the mixture of 77 parts of the polymer prepared in Example 7 above, 18 parts of tetra(ethoxymethyl)di(methoxymethyl) melamine, 5 parts of diisopropanolamine, and 28 parts of titanium dioxide (rutile type) are added 860 parts of deionized water in several portions under vigorous agitation. The resulting aqueous paint, after aging for 24 hours, is employed to electrocoat zinc phosphated iron and aluminum substrates at from 200 to 250 volts. The coated panels are then washed with deionized water and baked at 175°C. for 20 minutes. Initial film properties, such as gloss, thickness, hardness, and flexibility, are comparable to those obtained in Example 13 and 14 above. However, coagulation of solids in the bath appeared within three days. Further, the gloss and film thickness were reduced considerably in 4 to 7 days. The bath had to be replaced within 48 hours to maintain uniformity of physical properties of the substrates being coated.

EXAMPLE 16

To the mixture of 72 parts of polymer prepared in Example 5 above, 18 parts of tetra(ethoxymethyl)di(methoxymethyl) melamine, 5 parts of diisopropanol amine, and 28 parts of titanium dioxide (rutile type) are added with agitation. To this paste is added deionized water (860 parts) in portions under vigorous agitation.

Resultant aqueous paint, after aging as a bath for 24 hours, is employed to electrocoat zinc phosphated steel and aluminum substrates. The coated panels, after rinsing with deionized water, are baked at 175°C. for 20 minutes. Film properties obtained are summarized in Table II below.

TABLE II

| Steel Substrate | Thickness (mil) | Knoop Hardness | Impact (Reverse) In. Lb. | Gloss (in %) (60°) | (20°) |
|---|---|---|---|---|---|
| 150 V | 0.9 | 9.2 | 5–10 | 82 | 57 |
| 200 V | 1.0 | 8.0 | 5–10 | 84 | 64 |
| Aluminum | | | | | |
| 100 V | 0.9 | 7.0 | 5–10 | 87 | 70 |

EXAMPLE 17

An aqueous paint is prepared as in Example 16 using resin prepared in Example 10. The resultant paint is aged for 24 hours. Panels of zinc phosphated steel and aluminum substrate are electrocoated for a period of 1 minutes. The coated panels, after rinsing with deionized water, are baked at 125°C. for 30 minutes. The film properties are noted below in Table III.

TABLE III

| Steel Substrate | Thickness (mil) | Knoop Hardness | Impact (Reverse) In. Lb. | Gloss (in %) (60°) | (20°) |
|---|---|---|---|---|---|
| 150 V | 0.8 | 6.0 | 15 | 82 | 64 |
| 200 V | 1.0 | 4.1 | 15 | 84 | 68 |
| Aluminum | | | | | |
| 100 V | 1.0 | 4.7 | 15 | 88 | 76 |

The bath stabilities of electrocoating baths prepared in Examples 13, 14, 16 and 17 from resins in Examples 1, 2, 5, and 6, respectively are unchanged in terms of film properties and conductivity of the bath over a period of 2 months.

It has been pointed out hereinabove that the reaction between the maleic anhydride moiety containing copolymer and the selected aliphatic diol splits or opens the maleic anhydride ring, identified as an hetero-O-moiety, in order to produce a half ester of the maleic acid while avoiding the esterification of the residual carboxyl group moieties produced by the ring splitting reaction. This produces, in the polymeric composition, alcoholic hydroxyl alkyl ester moieties and carboxyl moieties in substantially equi-molar proportions. From this it can be seen that that acid number of the starting copolymer is approximately cut in half by the subsequent reaction with the selected diol. Actually the acid number of the final overall finished polymer is somewhat less than half of the acid number of the polymeric material before reaction with the selected diol because the esterification reaction adds to the molecular weight of the starting polymeric material. Ordinarily the molecular weight of the overall finished polymer of the present invention will vary between about 5,000 and 20,000, determined by conventional stoichiometrical calculations.

It has been pointed out in the examples that the polymer esterification reaction can be carried out between about 55°C. and 135°C. at atmospheric pressure including reflux. Subatmospheric pressures and superatmospheric pressures may be used but care must be exercised in these situations to insure that the anhydride ring is opened and that the half ester of maleic anhydride only is formed for all practical purposes and that there remains along the polymer linear chain a plurality of carboxyl groups as well as hydroxyl groups so as to provide in the resultant polymer from about 1 to about 0.5 to about 10% of the hydroxyl function based on the weight of the overall finished polymer.

We claim:

1. A process for preparing an anionic, water-dispersible, non-gelled, vinyl polymer containing carboxyl and alcoholic functions which comprises the steps of: initially copolymerizing by heating at a temperature between about 125°C. and 200°C. a blend of monomers comprising maleic anhydride and a different polymerizable $\alpha,\beta$-ethylenically unsaturated compound in the presence of a free radical initiator and, thereafter, reacting the resultant polymer with an aliphatic diol containing from about 3 to 8 carbon atoms and possessing primary and secondary hydroxyl groups at a temperature between about 55°C. and 135°C. for a period of time sufficient to open the anhydride ring and to form the half ester of maleic acid thereby producing an anionic water dispersible, non-gelled, vinyl polymer, said monomers and diol being present in amounts sufficient to supply to the resultant overall polymer from about 1 to about 25% of the carboxyl function and from about 0.5 to about 10% of the hydroxyl function, based on the weight of the overall finished polymer, wherein the thus formed non-gelled polymer is substantially free from unreacted monomer.

2. The process of claim 1 wherein the different $\alpha,\beta$-ethylenically unsaturated compound is styrene.

3. The process of claim 1 wherein the different $\alpha,\beta$-ethylenically unsaturated compound is ethyl vinyl ether.

4. The process of claim 1 wherein the different $\alpha,\beta$-ethylenically unsaturated compound is $C_{14}$ $\alpha$-olefin.

5. The process of claim 2 wherein the blend of monomers includes an alkyl acrylate.

6. The process of claim 2 wherein the alkyl acrylate is n-butyl acrylate.

7. The process of claim 1 wherein the diol is 1,2-propylene glycol.

8. The process of claim 1 wherein the diol is 1,3-butanediol.

9. The process of claim 1 wherein the diol is 2,2-dimethyl-1,3-butanediol.

10. The product produced according to the process of claim 1.

* * * * *